(12) United States Patent
Ohata (10) Patent No.: US 11,384,709 B2
(45) Date of Patent: Jul. 12, 2022

(54) FUEL INJECTION CONTROL DEVICE AND FUEL INJECTION CONTROL METHOD

(71) Applicant: HITACHI AUTOMOTIVE SYSTEMS, LTD., Hitachinaka (JP)

(72) Inventor: Eiichiro Ohata, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/763,650

(22) PCT Filed: Oct. 31, 2018

(86) PCT No.: PCT/JP2018/040454
§ 371 (c)(1),
(2) Date: May 13, 2020

(87) PCT Pub. No.: WO2019/102807
PCT Pub. Date: May 31, 2019

(65) Prior Publication Data
US 2020/0277915 A1    Sep. 3, 2020

(30) Foreign Application Priority Data

Nov. 24, 2017    (JP) ............................ JP2017-225699

(51) Int. Cl.
*F02D 41/30*    (2006.01)
*F02M 51/06*    (2006.01)
(Continued)

(52) U.S. Cl.
CPC ..... *F02D 41/3005* (2013.01); *F02D 41/1401* (2013.01); *F02D 41/2416* (2013.01);
(Continued)

(58) Field of Classification Search
CPC ............ F02D 41/3005; F02D 41/2416; F02D 41/1401; F02D 41/345; F02D 2041/2058;
(Continued)

(56) References Cited

U.S. PATENT DOCUMENTS 5,865,371 A * 2/1999 Pace ....................... F02D 41/20
239/585.4
5,992,391 A * 11/1999 Yamakado ......... F02M 51/0621
361/147
(Continued)

FOREIGN PATENT DOCUMENTS

JP    2004-176546 A    6/2004
JP    2007-162644 A    6/2007
(Continued)

OTHER PUBLICATIONS

Karim Nice "How Car Computers Work" Apr. 11, 2001. HowStuffWorks.com. <https://auto.howstuffworks.com/under-the-hood/trends-innovations/car-computer.htm> Nov. 16, 2009 (Year: 2009).*

(Continued)

*Primary Examiner* — Phutthiwat Wongwian
*Assistant Examiner* — Susan E Scharpf
(74) *Attorney, Agent, or Firm* — Foley & Lardner LLP (57) ABSTRACT

Provided is a fuel injection control device that controls a fuel injection amount at higher accuracy. The fuel injection control device includes: a base waveform acquisition section 823 that generates a control current S9 for controlling a fuel injector 400; an A/D converter 824 that acquires a drive current P for the fuel injector 400 (controlled based on the control current S9) at each of measurement timings t1 to t6 based on a counter cycle; and an arithmetic operation section 821 that, based on a drive current P1 at a first measurement timing t1 and a drive current P2 at a second measurement (Continued)

timing t2 later than the first measurement timing t1, both acquired by the base waveform acquisition section 823, predicts a drive current P3 at a third measurement timing t3 later than the second measurement timing. With this configuration, the arithmetic operation section 821 makes a comparison between a predicted electric power amount calculated based on the drive current P3 at the third measurement timing t3 that the arithmetic operation section 821 has predicted and a target electric power amount calculated based on a control current predetermined, so as to correct the control current S9.

5 Claims, 5 Drawing Sheets

(51) Int. Cl.
*F02D 41/34* (2006.01)
*F02D 41/14* (2006.01)
*F02D 41/24* (2006.01)
*B05B 12/00* (2018.01)
*F02D 41/20* (2006.01)

(52) U.S. Cl.
CPC .......... *F02D 41/345* (2013.01); *F02M 51/06* (2013.01); *B05B 12/004* (2013.01); *F02D 41/20* (2013.01); *F02D 2041/1412* (2013.01); *F02D 2041/2058* (2013.01); *Y02T 10/40* (2013.01)

(58) Field of Classification Search
CPC ............. F02D 41/20; F02D 2041/1412; F02D 2041/2003; F02M 51/06; Y02T 10/40; B05B 12/004
See application file for complete search history.

(56) References Cited

U.S. PATENT DOCUMENTS

| | | | |
|---|---|---|---|
| 6,173,700 B1* | 1/2001 | Yamashita | F02D 41/20 123/490 |
| 6,571,773 B1* | 6/2003 | Yamakado | F02D 41/20 361/152 |
| 6,742,505 B2* | 6/2004 | Liskow | F02D 41/2467 123/498 |
| 7,034,437 B2* | 4/2006 | Fukagawa | F02D 41/2096 310/317 |
| 9,261,038 B2* | 2/2016 | Nishida | F02D 41/28 |
| 2004/0118384 A1* | 6/2004 | Oyama | F02D 41/3082 123/479 |
| 2008/0103675 A1* | 5/2008 | Ishizuka | F02D 41/402 701/103 |
| 2008/0201060 A1* | 8/2008 | Nagai | F02D 41/402 701/103 |
| 2010/0242920 A1* | 9/2010 | Omori | F02D 41/20 123/490 |
| 2011/0100333 A1* | 5/2011 | Toyohara | F02D 41/40 123/490 |
| 2015/0108238 A1 | 4/2015 | Grandi | |
| 2015/0144109 A1* | 5/2015 | Mukaihara | F02D 41/36 123/490 |
| 2016/0177855 A1* | 6/2016 | Kusakabe | F02M 51/0685 123/490 |
| 2017/0191437 A1 | 7/2017 | Yanoto | |
| 2018/0017005 A1* | 1/2018 | Kusakabe | F02M 51/061 |

FOREIGN PATENT DOCUMENTS

| | | |
|---|---|---|
| JP | 2014-005740 A | 1/2014 |
| JP | 2014-031790 A | 2/2014 |
| JP | 2015-227620 A | 12/2015 |

OTHER PUBLICATIONS

International Search Report with English translation and Written Opinion issued in corresponding application No. PCT/JP2018/040454 dated Feb. 19, 2019.

* cited by examiner

FUEL INJECTION CONTROL DEVICE AND FUEL INJECTION CONTROL METHOD

TECHNICAL FIELD

The present invention relates to a fuel injection control device and a fuel injection control method.

BACKGROUND ART

Techniques such as Lean-burn and Exhaust Gas Recirculation (EGR) have been developed in recent years for purposes of improving fuel economy for vehicles and increasing vehicle exhaust gas restriction. With the Lean-burn technique, a system is operated by air-fuel mixture leaner than a theoretical air-fuel ratio, and the EGR technique works by recirculating a part of exhaust gas after combustion back to the system.

With an internal combustion engine for such purposes of improving fuel economy and increasing exhaust gas restriction, an amount of fuel or air in a combustion chamber deviates from a theoretical value, causing a spark plug to be prone to an ignition failure of the fuel.

With a demand for low fuel economy and high performance against exhaust gas, the internal combustion engine is required of a high level of control on air-fuel ratio to suppress the ignition failure. The internal combustion engine is thus required to reduce fluctuation in an amount of fuel injected from a fuel injector.

PTL 1 discloses a fuel injection control device. With consideration of an amount of fuel injected from a fuel injector from at the time when a fuel injection pulse transmitted to the fuel injector is switched off until a plunger of the fuel injector actually closes, the fuel injection control device corrects a width of the fuel injection pulse, so as to adjust the amount of fuel injected from the fuel injector.

Further, PTL 2 discloses a fuel injection control device that measures current for a coil driving a plunger of a fuel injector and calculates a gradient of the current measured. Based on the gradient of the current, the fuel injection control device corrects a deviation in peak point of the current actually flowing through the coil.

CITATION LIST

Patent Literature

PTL 1: JP 2004-176546 A
PTL 2: JP 2015-227620 A

SUMMARY OF INVENTION

Technical Problem

However, an actual rise of high current for opening the plunger of the fuel injector is not linear due to mechanical properties of the fuel injector. Thus, the fuel injection control device disclosed in each of PTL 1 and PTL fluctuates in control of opening the plunger, thereby resulting in less accurate control of the amount of fuel injected.

In view of the respects described above, an object of the present invention is to provide a fuel injection control device that controls an amount of fuel injected at higher accuracy.

Solution to Problem

In order to solve the problems described above, the present invention provides a fuel injection control device for controlling a fuel injector. The fuel injection control device includes: a control current generation unit configured to generate a control current for controlling the fuel injector; a current acquisition unit configured to acquire a drive current at each predetermined time for the fuel injector that is controlled based on the control current; and a current prediction unit configured to, based on a first drive current at a first time and a second drive current at a second time later than the first time, each acquired by the current acquisition unit, predict a third drive current at a third time later than the second time. With this configuration, the control current generation unit makes a comparison between predicted electric power calculated based on the third drive current at the third time that the current prediction unit has predicted and target electric power calculated based on a predetermined target drive current, in order to correct the control current.

Advantageous Effects of Invention

The present invention provides a fuel injection control device that controls an amount of fuel injected at higher accuracy.

DESCRIPTION OF EMBODIMENTS

[Internal Combustion Engine]

First, an electronic control unit (ECU) 1 and an internal combustion engine 100, each according to an embodiment of the present invention, will be described. The electronic control unit (hereinafter, referred to as ECU) 1 includes a fuel injection controller 82, and controls the internal combustion engine 100. The internal combustion engine 100 may have a single cylinder or a plurality of cylinders. The embodiment will exemplarily describe a case where the internal combustion engine 100 with four cylinders includes a fuel injector 400 and an amount of fuel injected from the fuel injector 400 is controlled.

Figure 1:
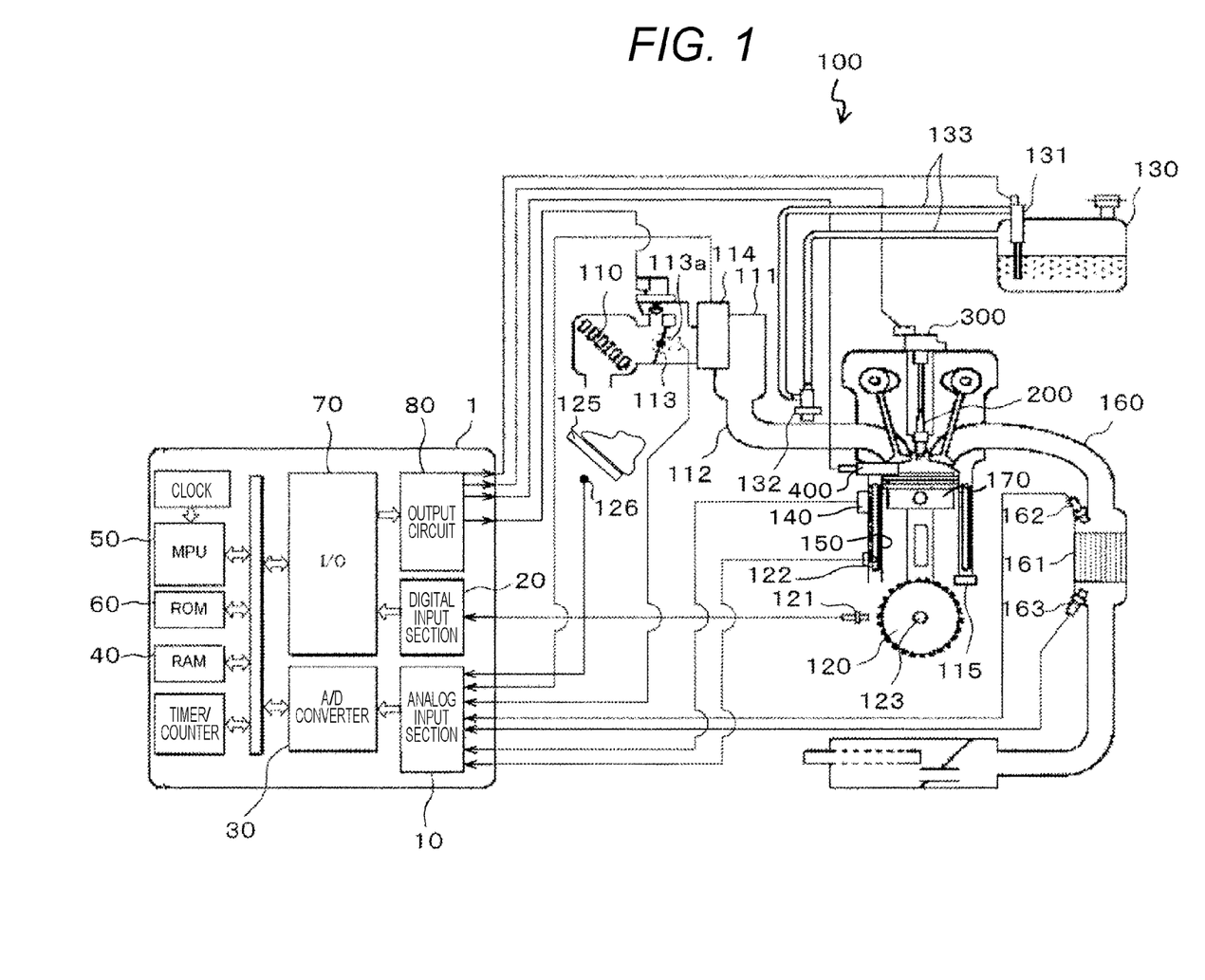
FIG. 1 is a diagram illustrating a main part configuration of each of an internal combustion engine according to an embodiment and an electronic control unit (ECU) according to the embodiment.

FIG. 1 is a diagram illustrating a main part configuration of the internal combustion engine 100 and the ECU 1.

As illustrated in FIG. 1, air taken from outside into the internal combustion engine 100 flows through an air cleaner 110, an intake pipe 111, and an intake manifold 112, and flows into each of cylinders 150. The air flowing into each of the cylinders 150 is adjusted in an amount by a throttle valve 113, and the amount of the air adjusted by the throttle valve 113 is measured by a flow sensor 114.

The throttle valve 113 includes a throttle opening sensor 113*a* for detecting an opening of the throttle valve 113, and information for the opening of the throttle valve 113 detected by the throttle opening sensor 113a is output to the ECU (Electronic Control Unit) 1.

Here, the throttle valve 113 is an electronic throttle valve driven by an electric motor, but any other system capable of adequately adjusting the flow rate of the air may be employed.

Temperature of the gas flowing into each of the cylinders 150 is detected by an intake air temperature sensor 115.

A ring gear 120 is mounted to a crank shaft 123, and at a radially outer side of the ring gear 120, a crank angle sensor 121 is disposed. The crank angle sensor 121 detects a rotational angle of the crank shaft 123. In the embodiment, the crank angle sensor 121 detects the rotational angle of the crank shaft 123 every 10 degrees of the rotation and at each combustion cycle.

A water temperature sensor 122 is provided to a water jacket (not illustrated) of a cylinder head, and the water temperature sensor 122 detects temperature of cooling water for the internal combustion engine 100.

The vehicle also includes an accelerator position sensor (APS) 126. The accelerator position sensor 126 detects a displacement amount (depression amount) of the accelerator pedal 125, thereby detecting driver request torque. The driver request torque detected by the accelerator position sensor 126 is output to the ECU 1 as will be described later. The ECU 1 controls the throttle valve 113 based on the driver request torque.

Fuel is stored in a fuel tank 130, and the fuel is pumped and pressurized by a fuel pump 131. Subsequently, the fuel flows through a fuel pipe 133 provided with a pressure regulator 132 to be drawn to the fuel injector 400. The pressure regulator 132 adjusts the fuel output from the fuel pump 131 to a predetermined pressure, and the fuel injector 400 injects the fuel into each of the cylinders 150.

The fuel injector 400 is controlled based on a fuel injection pulse (control signal) from the fuel injection controller 82 of the ECU 1 as will be described later.

Surplus fuel out of the fuel adjusted to the predetermined pressure by the pressure regulator 132 is returned to the fuel tank 130 via a return pipe (not illustrated).

Here, a specific configuration of the fuel injector 400 will be described.

Figure 2:
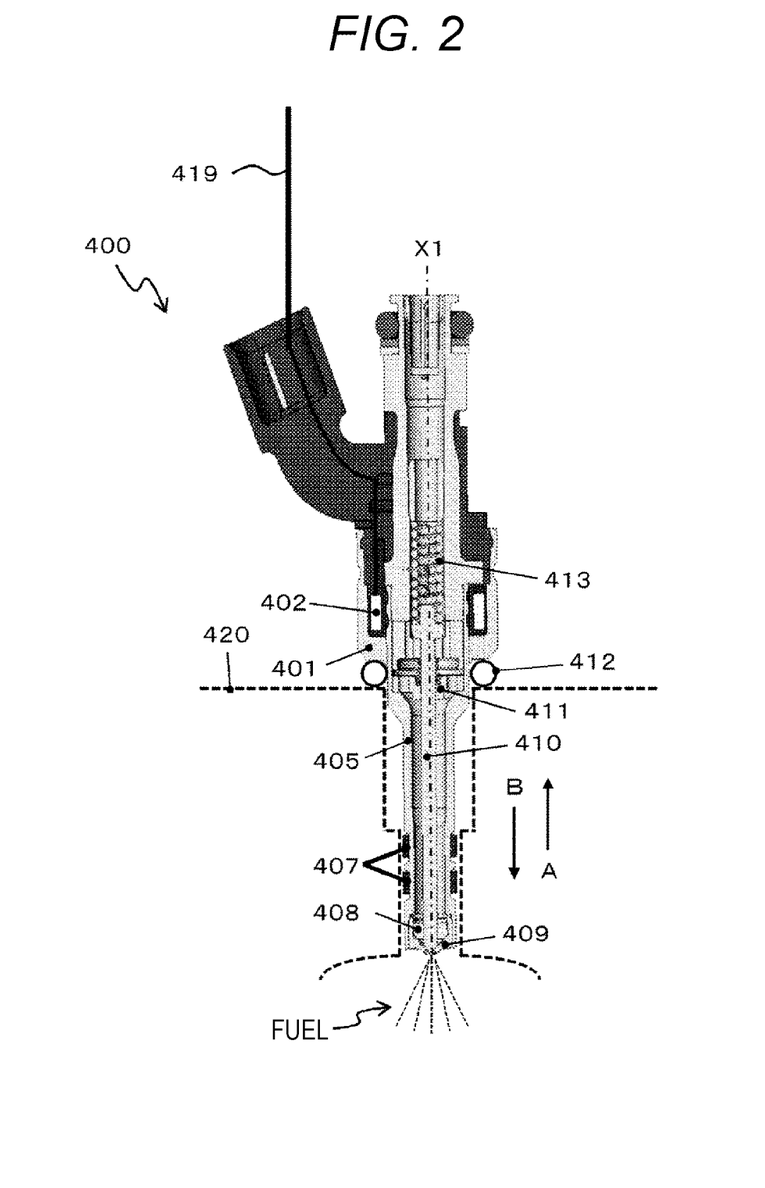
FIG. 2 is a diagram showing a function of a fuel injection controller.

FIG. 2 is a sectional view illustrating the configuration of the fuel injector 400.

The fuel injector 400 is mounted to a cylinder head 420 from a side of a nozzle 405, and an area between the nozzle 405 and the cylinder head 420 is sealed with a ring seal 412 and a tip seal 407.

In the nozzle 405, a plunger 410 is slidably disposed along an axial direction of a central axis X1.

The fuel injection controller 82 transmits a fuel injection pulse S9 (control signal), based on which current is supplied to a coil 402 via a power line 419. Thus, electromagnetic force is generated in the coil 402, causing the plunger 410 to resist pressing force applied from a spring 413 and move in a direction A along the central axis X1. In this state, the plunger 410 is guided by a guide 408 and a guide 411.

This configuration forms a gap between a tip of the plunger 410 and an orifice cup 409, causing the fuel injector 400 to open. An amount of the movement of the plunger 410 with respect to the orifice cup 409 is referred to as a lift amount.

In the fuel injector 400, the lift amount of the plunger 410 is controlled in accordance with a magnitude of the current based on the fuel injection pulse S9. The amount of fuel injected from the fuel injector 400 is controlled in accordance with the lift amount of the plunger 410.

In the fuel injector 400, when the fuel injection pulse S9 transmitted from the fuel injection controller 82 stops, the current supplied to the coil 402 stops, and no electromagnetic force is generated in the coil 402. The plunger 410 is thereby pressed by the spring 413 in a direction B along the central axis X1.

With this configuration, the tip of the plunger 410 closes a through hole of the orifice cup 409, causing the fuel injector 400 to close. In this state, the fuel injector 400 stops injecting the fuel from the gap between the plunger 410 and the orifice cup 409.

The direction of arrow A along the central axis X1 (as previously described) is referred to as an opening direction of the fuel injector 400. The direction of arrow B (as previously described) is referred to as a closing direction of the fuel injector 400.

Referring back to FIG. 1, the internal combustion engine 100 includes the cylinder head (not illustrated) where a cylinder pressure sensor (CPS; also referred to as an in-cylinder pressure sensor) 140 is disposed. The cylinder pressure sensor 140 is disposed in each of the cylinders 150 and detects internal pressure (combustion pressure) of the corresponding cylinder 150.

The cylinder pressure sensor 140 is a piezoelectric pressure sensor or a gauge pressure sensor, and is configured to detect the combustion pressure (in-cylinder pressure) of each of the cylinders 150 in a wide range of temperatures.

Each of the cylinders 150 has an exhaust manifold 160 mounted for discharging combustion gas (exhaust gas) out of the corresponding cylinder 150. The exhaust manifold 160 has, on its exhaust side, a three-way catalyst 161. The exhaust gas is purified by the three-way catalyst 161 and then discharged to the atmosphere.

In upstream of the three-way catalyst 161, an upstream air-fuel ratio sensor 162 is disposed. The upstream air-fuel ratio sensor 162 continuously detects an air-fuel ratio of the exhaust gas discharged from each of the cylinders 150.

In downstream of the three-way catalyst 161, a downstream air-fuel ratio sensor 163 is disposed. The downstream air-fuel ratio sensor 163 outputs a detection signal that generally switches on/off in a vicinity of theoretical air-fuel ratio. In the embodiment, the downstream air-fuel ratio sensor 163 is an O2 sensor.

Additionally, at top of each of the cylinders 150, a spark plug 200 is disposed. The spark plug 200 discharges (sparks) to ignite air-fuel mixture in each of the cylinders 150, causing an explosion in the corresponding cylinder 150. In this state, a piston 170 is pushed down. When the piston 170 is pushed down, the crank shaft 123 rotates.

Each of various sensors described above, such as the throttle opening sensor 113a, the flow sensor 114, the crank angle sensor 121, the accelerator position sensor 126, the water temperature sensor 122, and the cylinder pressure sensor 140, outputs an output signal to the ECU 1. The ECU detects an operating state of the internal combustion engine 100 based on the output signal from each of the various sensors, and controls the amount of air sent into each of the cylinders 150, the amount of fuel injected from the fuel injector 400, an ignition timing of the spark plug 200, and the like.

[Hardware Configuration of ECU]

Next, an overall hardware configuration of the ECU 1 will be described.

As illustrated in FIG. 1, the ECU 1 includes an analog input section 10, a digital input section 20, an A/D (analog/digital) converter 30, a RAM (random access memory) 40, a MPU (micro-processing unit) 50, a ROM (read only memory) 60, an I/O (input/output) port 70, and an output circuit 80.

The analog input section 10 receives an analog output signal from each of the various sensors, such as the throttle opening sensor 113*a*, the flow sensor 114, the accelerator position sensor 126, the upstream air-fuel ratio sensor 162, the downstream air-fuel ratio sensor 163, the cylinder pressure sensor 140, and the water temperature sensor 122.

The analog input section 10 is connected to the A/D converter 30. The analog output signal from each of the various sensors is input into the analog input section 10 and subjected to signal processing, e.g., noise removal. Subsequently, the analog output signal is converted into a digital signal by the A/D converter 30 and is stored in the RAM 40.

The digital input section 20 receives a digital output signal from the crank angle sensor 121.

The digital input section 20 is connected to the I/O port 70. The digital output signal is input into the digital input section 20 and is stored in the RAM 40 via the I/O port 70.

Each of the output signals stored in the RAM 40 is subjected to an arithmetic operation in the MPU 50.

The MPU 50 executes a control program (not illustrated) stored in the ROM 60, and provides the arithmetic operation on each of the output signals stored in the RAM 40 based on the control program. The MPU 50 calculates a control value based on the control program. The control value specifies an operation amount of each actuator driving the internal combustion engine 100 (e.g., the throttle valve 113, the pressure regulator 132, or the spark plug 200), and is temporarily stored in the RAM 40.

The control value, which specifies the operation amount of the actuator and is stored in the RAM 40, is subsequently output to the output circuit 80 via the I/O port 70.

The output circuit 80 includes functions, such as the fuel injection controller 82 (see FIG. 3) for controlling drive of the plunger 410 (see FIG. 2) of the fuel injector 400, and an ignition controller 83 (see FIG. 3) for controlling voltage applied to the spark plug 200.

[Functional Block of ECU]

Next, a functional configuration of the ECU 1 will be described.

Figure 3:
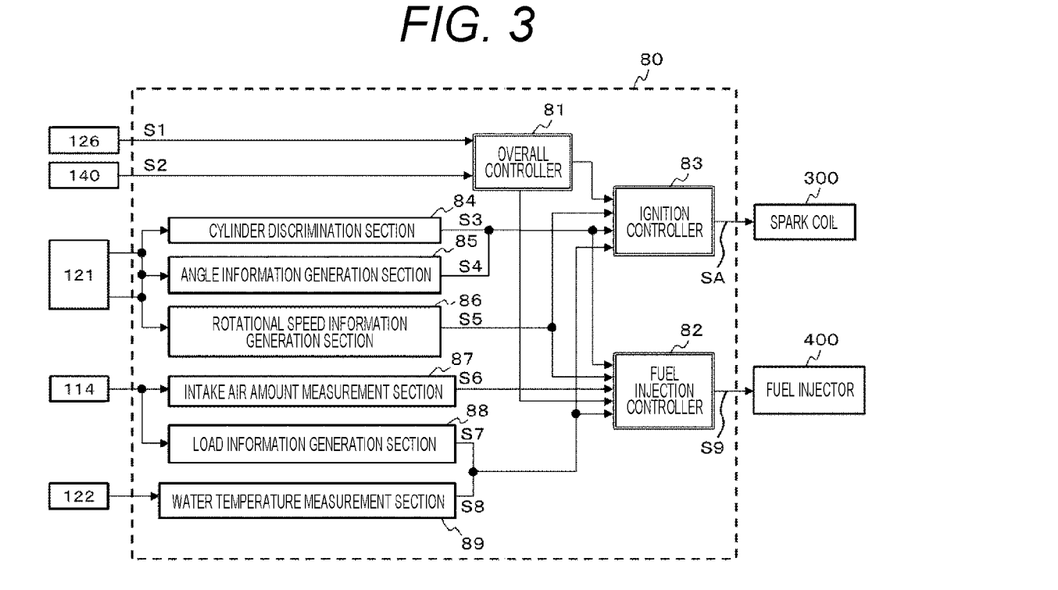
FIG. 3 is a block diagram showing a functional configuration of the electronic control unit (ECU).

FIG. 3 is a block diagram showing the functional configuration of the ECU 1.

Figure 4:
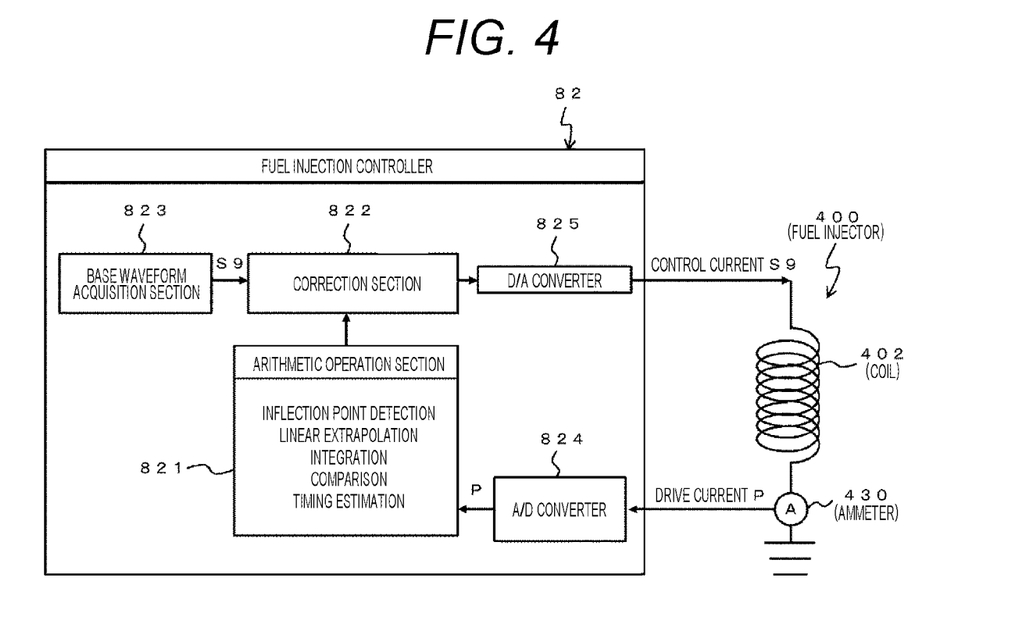
FIG. 4 is a sectional view illustrating a configuration of a fuel injector.

FIG. 4 is a diagram showing a function of the fuel injection controller 82.

In the ECU 1, the MPU 50 executes the control program stored in the ROM 60 to achieve various functions in the output circuit 80. This configuration causes the fuel injection controller 82 in the output circuit 80 to control the fuel injector 400 and causes the ignition controller 83 in the output circuit 80 to control the discharge of the spark plug 200.

As shown in FIG. 3, the output circuit 80 in the ECU includes an overall controller 81, the fuel injection controller 82, and the ignition controller 83.

The overall controller 81 is connected to the accelerator position sensor 126 and the cylinder pressure sensor 140, and receives the driver request torque (an acceleration signal S1) from the accelerator position sensor 126 and an output signal S2 from the cylinder pressure sensor 140.

[Overall Controller]

The overall controller 81 has an overall control of the fuel injection controller 82 and the ignition controller 83 based on the driver request torque (acceleration signal S1) from the accelerator position sensor 126 and the output signal S2 from the cylinder pressure sensor 140.

[Ignition Controller]

The ignition controller 83 is connected to and receives information from the overall controller 81, a cylinder discrimination section 84, an angle information generation section 85, a rotational speed information generation section 86, a load information generation section 88, and a water temperature measurement section 89.

Based on the information received, the ignition controller 83 calculates an amount of current (angle of current flow) supplied to a primary coil 310 of a spark coil 300, time to start the current flow, and time to cut off the current supplied to the primary coil 310 (ignition time).

Then, based on the amount of the current flow, the time to start the current flow, and the ignition time calculated, the ignition controller 83 outputs an ignition signal S to the primary coil 310 of the spark coil 300 to control the discharge of the spark plug 200.

[Fuel Injection Controller]

The fuel injection controller 82 is connected to each of the cylinder discrimination section 84, the angle information generation section 85, and the rotational speed information generation section 86. The cylinder discrimination section 84 discriminates each of the cylinders 150 of the internal combustion engine 100, and provides cylinder discrimination information S3 to the fuel injection controller 82. The angle information generation section 85 measures a crank angle of the crank shaft 123, and provides crank angle information S4 to the fuel injection controller 82. The rotational speed information generation section 86 measures engine rotational speed, and provides engine rotational speed information S5 to the fuel injection controller 82.

Further, the fuel injection controller 82 is connected to each of an intake air amount measurement section 87, the load information generation section 88, and the water temperature measurement section 89. The intake air amount measurement section 87 measures an intake amount of the air taken into each of the cylinders 150, and provides intake air amount information S6 to the fuel injection controller 82. The load information generation section 88 measures engine load, and provides engine load information S7 to the fuel injection controller 82. The water temperature measurement section 89 measures the temperature of engine cooling water, and provides cooling water temperature information S8 to the fuel injection controller 82.

Based on each of the information received, the fuel injection controller 82 calculates the amount of fuel injected from the fuel injector 400 and time taken for the fuel injection. Then, based on the amount and the time for the fuel injection calculated, the fuel injection controller 82 generates and transmits the fuel injection pulse S9 to the fuel injector 400.

As shown in FIG. 4, the fuel injection controller 82 includes an arithmetic operation section 821, a correction section 822, a base waveform acquisition section 823, an A/D (analog to digital) converter 824, and a D/A (digital to analog) converter 825.

The base waveform acquisition section 823 acquires from the ROM 60 a base waveform (digital signal) of the fuel injection pulse S9 in accordance with the operating state (target drive force) of the internal combustion engine 100. The base waveform of the fuel injection pulse S9 is prepared in a plurality of forms in accordance with the operating state, and is stored in a storage medium such as the ROM 60.

Figure 5:
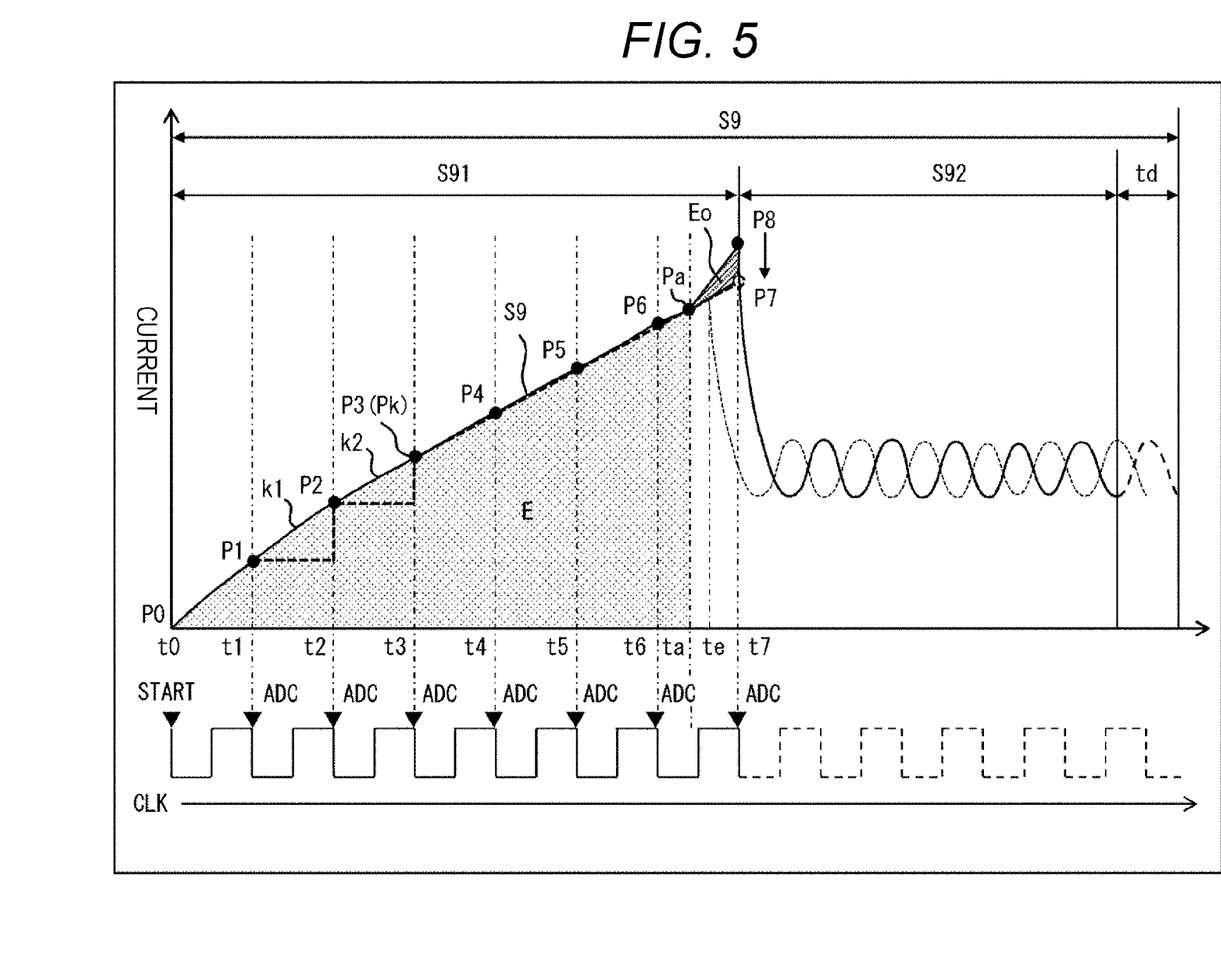
FIG. 5 is a graph showing a method for correcting fuel injection pulse by the fuel injection controller.

The base waveform of the fuel injection pulse S9 includes a high current S91 and a hold current S92 (see FIG. 5). The high current S91 is set at high current value in order to cause the plunger 410 of the fuel injector 400 to open from a closed state. The hold current S92 is held at constant range of current values lower than the high current S91 in order to hold the plunger 410 (that has opened) in an open state.

In the fuel injection controller 82, the base waveform (digital signal) of the fuel injection pulse S9 acquired by the base waveform acquisition section 823 is converted by the D/A converter 825 into an analog signal, that is, a control current.

Note that, in a case where the fuel injection pulse S9 (digital signal before the D/A conversion) is not particularly distinguished from the control current (analog signal after the D/A conversion), the control current is referred to as a control current S9.

The control current S9 as the analog signal converted by the D/A converter 825 is supplied to the fuel injector 400 (coil 402). In the fuel injector 400, the lift amount of the plunger 410 is controlled based on the control current S9.

At one end of the fuel injector 400 (coil 402), an ammeter 430 is disposed. The ammeter 430 measures a drive current P (an analog value) that actually flows through the coil 402.

The drive current P measured by the ammeter 430 is converted into a digital signal by the A/D converter 824 of the fuel injection controller 82 and then transmitted to the arithmetic operation section 821.

Note that, in a case where the drive current P actually flowing through the coil 402 (analog value measured by the ammeter 430) is not particularly distinguished from the drive current after converted into the digital signal by the A/D converter 824, "drive current P" denotes the drive current after converted into the digital signal by the A/D converter 824.

The arithmetic operation section 821 detects an inflection point Pk of a waveform of the drive current based on the drive current P (see FIG. 5) for the coil 402, one measured at a present measurement timing and the other measured at a previous (latest) measurement timing.

Here, the waveform of the drive current P flowing through the coil 402 is determined in accordance with the waveform of the control current S9 supplied to the coil 402. With this configuration, the arithmetic operation section 821 detects the inflection point Pk of the waveform of the drive current P (waveform of the control current S9) based on results of previous measurements of the drive current P (measured at least at two different times).

Note that, the inflection point Pk is a point where a gradient of a curve changes, and the waveforms from the inflection point Pk onward may be approximated by a straight line.

When the arithmetic operation section 821 determines that the drive current P measured at the present measurement timing corresponds to the inflection point Pk, the arithmetic operation section 821 uses linear extrapolation to calculate a predicted value of each of the drive currents P from the inflection point Pk onward.

Here, the linear extrapolation is used to obtain, based on certain known numerical data, a predicted subsequent value outside the numerical data range.

The arithmetic operation section 821 uses the linear extrapolation to predict each of the drive currents P from the inflection point Pk onward, and calculates an electric power amount based on the corresponding drive current P predicted. Then, the arithmetic operation section 821 compares the electric power amount with an electric power amount that is calculated based on the control current S9 as a target value, so as to estimate a timing (time) to at which the drive current P (predicted value) is to exceed the control current S9 (target value). Here, each of the electric power amounts may be obtained as an area of the drive current P or the control current S9 (see an area E in FIG. 5 as an example).

When the arithmetic operation section 821 determines that the drive current P measured at a predetermined measurement timing has already exceeded the control current S9, the arithmetic operation section 821 immediately stops supplying the fuel injection pulse S9 to the fuel injector 400.

On the other hand, upon a determination that the drive current P measured at the predetermined measurement timing does not exceed the control current S9, the correction section 822 calculates the timing ta at which the drive current P is to exceed the control current S9. Based on the timing ta, the correction section 822 corrects the control current S9 (fuel injection pulse S9) in a magnitude or a length.

The base waveform acquisition section 823 and the arithmetic operation section 821, each described above and configured to acquire and generate the control current S9, correspond to a control current generation unit according to the present invention. The configuration, with which the drive current P measured by the ammeter 430 is acquired by the A/D converter 824, corresponds to a current acquisition unit according to the present invention. The arithmetic operation section 821 configured to predict the drive current corresponds to a current prediction unit according to the present invention. Further, the correction of the control current S9 by the arithmetic operation section 821 and the correction section 822 corresponds to a correction of the control current by a control current generation unit according to the present invention.

[Method for Correcting Control Current (Fuel Injection Pulse)]

Next, a method for correcting the control current (fuel injection pulse) S9 by the fuel injection controller 82 above will be described.

FIG. 5 is a graph showing the method for correcting the fuel injection pulse S9 by the fuel injection controller 82. FIG. 5 exemplifies each of the drive current P and the control current S9, and the predicted value of the drive current P is shown with a broken line.

In FIG. 5, the graph in upper stage shows a relationship between the control current S9 after the D/A conversion (that is generated in the fuel injection controller 82) and the drive current P for the fuel injector 400 (coil 402) that is driven based on the control current S9.

The control current S9 generated in the fuel injection controller 82 is mainly divided into the high current S91 and the hold current S92. The high current S91 is configured to cause the plunger 410 of the fuel injector 400 to open at a predetermined angle from the closed state. The hold current S92 is configured to hold the plunger 410 in the open state.

The graph in lower stage of FIG. 5 shows the measurement timing for the drive current P. The drive current P is measured at the predetermined measurement timing that is based on a predetermined clock frequency. Specifically, the drive current P is measured at a predetermined clock fall timing.

Hereinafter, the predetermined clock fall timing will be referred to as a measurement timing ADC.

As shown in FIG. 5, the fuel injection controller 82 drives the fuel injector 400, based on the control current S9 into which the fuel injection pulse S9 (acquired from the base waveform acquisition section 823) has been D/A converted. In the fuel injector 400, the control current S9 generates a magnetic flux in the coil 402, and the magnetic flux causes the plunger 410 to move in the direction A along the central axis X1 (see FIG. 2). Based on the movement of the plunger 410, the lift amount of the plunger 410 with respect to the orifice cup 409 is set.

The fuel injection controller 82 acquires the drive current P for the fuel injector 400 (coil 402) from the ammeter 430 at the measurement timing ADC predetermined. In the embodiment, drive currents acquired at predetermined measurement timings t1 to t6 are respectively indicated by P1 to P6, and a drive current to be acquired at a future measurement timing t7 is indicated by P7.

As shown in FIG. 5, the arithmetic operation section 821 of the fuel injection controller 82 measures the drive current P for the coil 402 at each of the predetermined measurement timings t1 to t6. Then, the arithmetic operation section 821 sequentially stores the drive current P measured at each of the measurement timings t1 to t6 in a predetermined storage area of the RAM 40 in the ECU 1.

The arithmetic operation section 821, for example, reads from the RAM 40 each of the drive current P1 at the first measurement timing t1 (a first time) and the drive current P2 at the second measurement timing t2 (a second time), and calculates a change rate k1 between the drive currents P1 and P2.

Next, the arithmetic operation section 821 reads from the RAM 40 each of the drive current P2 at the second measurement timing t2 (second time) and the drive current P3 at the third measurement timing t3 (third time), and calculates a change rate k2 between the drive currents P2 and P3.

In the embodiment, the arithmetic operation section 821 compares the change rate k1 with the change rate k2. When the change rates k1 and k2 match each other, the arithmetic operation section 821 determines that the third measurement timing t3 corresponds to the inflection point Pk. From the inflection point Pk onward, the arithmetic operation section 821 uses the linear extrapolation to predict future drive currents P4 to P7 (see the broken line in FIG. 5).

From the third measurement timing t3 onward, the arithmetic operation section 821 continually acquires the drive current P for the coil 402 from the ammeter 430 at each of the measurement timings t4 to t7 based on the predetermined clock frequency. Concurrently, the arithmetic operation section 821 predicts the future drive current P based on the drive currents P acquired.

The arithmetic operation section 821 calculates the timing ta at which an electric power amount E (predicted value) calculated based on a future drive current Pa is to exceed a target electric power amount calculated based on the control current S9. In the embodiment, the arithmetic operation section 821 calculates that a predicted electric power amount E is to exceed the target electric power amount at the timing ta.

When the arithmetic operation section 821 determines that the timing ta is below (no later than) a next measurement timing t7, the arithmetic operation section 821 corrects the control current S9 at the next measurement timing t7 to be reduced by an amount corresponding to a surplus electric power amount Eo (see a dark hatched area in FIG. 5) from an electric power amount calculated based on a drive current P8. The drive current P8 has been predicted for the next measurement timing t7.

Specifically, the arithmetic operation section 821 controls to reduce the drive current P8 predicted for the next measurement timing t7 such that the electric power amount based on the drive current P8 matches the electric power amount based on the control current S9. In the embodiment, the arithmetic operation section 821 corrects the control current S9 such that the drive current P8 predicted for the next measurement timing t7 is reduced to the drive current P7.

Under this control, the electric power amount based on the drive current P7 is corrected to match the target drive electric power, and the lift amount of the plunger 410 reaches the target value.

On the other hand, when the arithmetic operation section 821 determines that the timing ta, at which the predicted electric power amount E based on the drive current P is to exceed the target electric power amount, has already exceeded the next measurement timing t7, the arithmetic operation section 821 immediately stops supplying the control current S9.

With this configuration, the fuel injection controller 82 minimizes an increase in the lift amount due to the predicted electric power amount E becoming greater than the target electric power amount.

Note that, when the fuel injection controller 82 determines that the predicted electric power amount E is to be greater than the target electric power amount, the fuel injection controller 82 adjusts a magnitude of the drive current P8 at the next measurement timing t7. Alternatively, instead of adjusting the magnitude of the drive current P8, the fuel injection controller 82 may adjust the control current S9 such that a length of the high current S91 is shortened (see a dotted line in FIG. 5).

The fuel injection controller 82 may, for example, terminate the high current S91 at a timing to that is shorter than the next measurement timing t7. With this configuration too, the predicted electric power amount E may approach the target electric power amount, and the lift amount of the plunger 410 may thereby be adjusted at high accuracy.

Here, the arithmetic operation section 821 may determine that, at the timing that the predicted electric power amount E is to exceed the target electric power amount, the correction of the high current S91 at the next measurement timing (e.g., the measurement timing t7) will not be effective to cause the predicted electric power amount E to fully approach the target electric power amount. In this case, the arithmetic operation section 821 may correct the control current S9 such that a length of the hold current S92 subsequent to the high current S91 is shortened (shortened by a length of time td in the embodiment).

As a result, the plunger 410 closes earlier for the length of time that the hold current S92 is shortened, and an absolute amount of the fuel injected from the fuel injector 400 is reduced. With this configuration, even when the correction of the high current S91 is not fully effective in some cases of the predicted electric power amount E or the timing, it is possible to control the amount of fuel injected more adequately and accurately by correcting the length of the hold current S92.

Note that, when each of the change rates k1 and k2 between the corresponding drive currents P at the predetermined measurement timings is equal to or greater than a predetermined threshold change rate, the arithmetic operation section 821 may correct the control current S9 such that each change rate from the change rate k2 onward becomes a change rate predetermined.

Here, with consideration of processing load of a CPU or the like, as previously described, the arithmetic operation section 821 preferably uses the linear extrapolation to predict each of the electric power amounts from the inflection point Pk onward. When the CPU has sufficient processing capability, however, the arithmetic operation section 821 may predict each of the electric power amounts by using spline extrapolation, polynomial approximation extrapolation, or a combination thereof.

[Method for Controlling Fuel Injector]

Next, a method for controlling the fuel injector 400 by the fuel injection controller 82 will be described.

Figure 6:
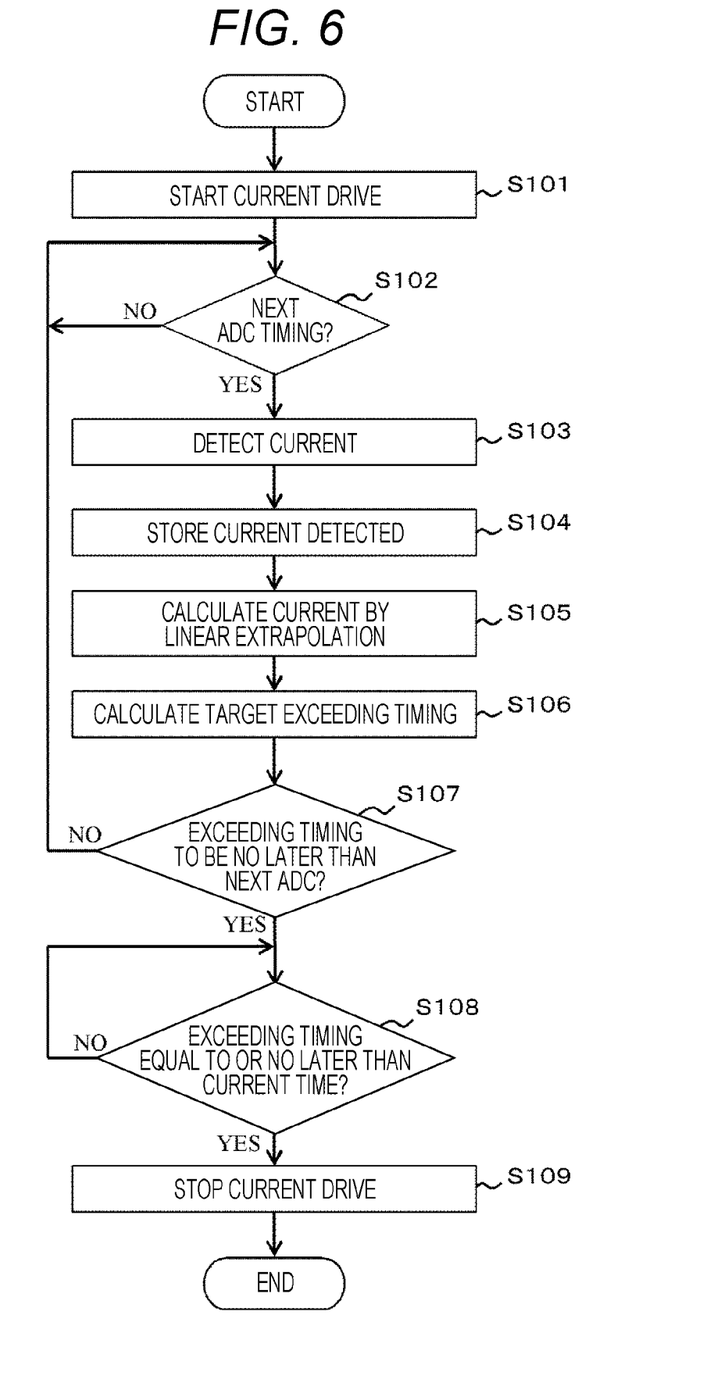
FIG. 6 is a flowchart of a method for controlling a fuel injector by the fuel injection controller.

FIG. 6 is a flowchart of a method for controlling the fuel injector 400 by the fuel injection controller 82.

As shown in FIG. 6, in step S101, the fuel injection controller 82 supplies the fuel injector 400 with the control current S9 (fuel injection pulse S9) in accordance with the operating state of the internal combustion engine 100, so as to start the current drive for the plunger 410.

In step S102, the fuel injection controller 82 determines whether or not the fuel injection controller 82 should acquire the drive current P flowing through the coil 402 from the ammeter 430 at the next measurement timing ADC. When the fuel injection controller 82 determines to do so at the next measurement timing ADC (step S102: YES), the fuel injection controller 82 moves to step S103. When the fuel injection controller 82 determines not to do so at the next measurement timing ADC (step S102: NO), the fuel injection controller 82 repeats the process of the step S102 at each predetermined period of time until actually reaching the next measurement timing ADC.

In the step S103, at the measurement timing ADC based on the predetermined sampling clock, the fuel injection controller 82 acquires the drive current P that flows through the coil 402 and has been measured by the ammeter 430.

In step S104, the fuel injection controller 82 stores the drive current P (acquired in the step S103) in a storage device such as the RAM 40.

In step S105, the fuel injection controller 82 reads from the RAM 40 the drive currents P measured at the previous measurement timings and the drive current P measured at the present measurement timing, both stored in the RAM 40 in the step S104. Based on these drive currents P, the fuel injection controller 82 determines whether or not the drive current P acquired at the present measurement timing corresponds to the inflection point Pk. When the fuel injection controller 82 determines that the current P acquired at the present measurement timing corresponds to the inflection point Pk, the fuel injection controller 82 uses the linear extrapolation to calculate each of the drive currents P from the inflection point Pk onward.

In step S106, the fuel injection controller 82 calculates the electric power amount based on the predicted value of the drive current P calculated in the step S105. Concurrently, the fuel injection controller 82 compares the electric power amount with the target electric power amount that is based on the operating state of the internal combustion engine 100 and required for the lift amount of the plunger 410 driven.

Based on the predicted value of the electric power amount and the target electric power amount, the fuel injection controller 82 calculates the timing te (hereinafter, referred to as an exceeding timing te) at which the electric power amount predicted is to exceed the target electric power amount.

In step S107, the fuel injection controller 82 determines whether or not the exceeding timing te calculated in the step S106 is below (no later than) the next measurement timing ADC. When the fuel injection controller 82 determines that the exceeding timing te is below (no later than) the next measurement timing ADC (step S107: YES), the fuel injection controller 82 moves to step S108. When the fuel injection controller 82 determines that the exceeding timing te is equal to or above (at or later than) the next measurement timing ADC (step S107: NO), the fuel injection controller 82 returns to the step S102 to acquire the drive current P at the next measurement timing ADC.

In the step S108, the fuel injection controller 82 determines whether or not the exceeding timing te calculated in the step S106 is equal to or below (at or no later than) the current time. When the fuel injection controller 82 determines that the exceeding timing te has already exceeded the current time (step S108: YES), the fuel injection controller 82 moves to step S109 to immediately stop supplying the control current S9 to the fuel injector 400. With this configuration, the fuel injection controller 82 minimizes excess of the fuel injection due to the control current S9 supplied in large amount.

On the other hand, when the fuel injection controller 82 determines that the exceeding timing te has not exceeded the current time (is later than the current time), the fuel injection controller 82 waits until the exceeding timing te exceeds the current time. The fuel injection controller 82 stops supplying the control current S9 to the fuel injector 400 at the timing that the exceeding timing te exceeds the current time.

As has been described above, in the embodiment, (1) a fuel injection controller 82 (fuel injection control device) for controlling a fuel injector 400 includes an arithmetic operation section 821 (current prediction unit), a base waveform acquisition section 823, and an A/D converter 824. Each of the arithmetic operation section 821 and the base waveform acquisition section 823 is configured to generate a control current S9 for controlling the fuel injector 400. The A/D converter 824 is configured to acquire a drive current P for the fuel injector 400 controlled based on the control current S9, at each of measurement timings t1 to t6 (each predetermined time) based on a counter cycle. The arithmetic operation section 821 is configured to, based on a drive current P1 (first drive current) at a first measurement timing t1 (first time) and a drive current P2 (second drive current) at a second measurement timing t2 (second time) later than the first measurement timing t1, each acquired by the base waveform acquisition section 823, predict a drive current P3 (third drive current) at a third measurement timing t3 (third time) later than the second measurement timing. With this configuration, the arithmetic operation section 821 makes a comparison between a predicted electric power amount calculated based on the drive current P3 at the third measurement timing t3 that the arithmetic operation section 821 has predicted and a target electric power amount calculated based on a control current predetermined (target drive current), so as to correct the control current S9.

With this configuration, the arithmetic operation section 821 makes a comparison between an electric power amount calculated based on a future drive current P that is predicted in accordance with drive currents P previously measured and the target electric power amount calculated based on the control current S9 as the target value. Based on the comparison above, the control current S9 is corrected, and thus, the fuel injection is controlled at higher accuracy.

(2) The arithmetic operation section 821 is also configured to calculate an exceeding timing to at which a predicted electric power amount E is to exceed the target electric power amount, and at the time of determining that the exceeding timing to is below (no later than) the next measurement timing at which the drive current P is to be acquired, stop generating the control current S9.

With this configuration, when the arithmetic operation section 821 determines that the predicted electric power amount E is to exceed the target electric power amount before the next measurement timing, the arithmetic operation section 821 immediately stops generating the control current S9. Thus, a lift amount of a plunger 410 in the fuel injector 400 is less prone to be excessive, and an amount of fuel injected is adequately controlled.

(3) The arithmetic operation section 821 is configured to use linear extrapolation to calculate the drive current P3 at the third measurement timing later than the second measurement timing, based on at least the drive current P1 at the first measurement timing t1 and the drive current P2 at the second measurement timing t2.

With this configuration, the arithmetic operation section 821 uses the linear extrapolation as a simple arithmetic expression to predict the future drive current P3 based on the drive currents P1 and P2 previously measured. In this state, the processing load of the arithmetic operation section 821 (CPU) is reduced.

(4) The arithmetic operation section 821 is configured to identify a difference between the drive current P3 at the third measurement timing t3 (that the arithmetic operation section 821 has predicted) and the drive current P4 of the current time (that is acquired at the measurement timing t4 [present predetermined measurement time]), and based on the difference, correct at least any one of a magnitude and a length of the control current S9.

With this configuration, the arithmetic operation section 821 corrects the magnitude or the length of the control current S9 based on the drive current P contributing to the lift amount of the plunger 410, and thus, the lift amount of the plunger 410 (amount of fuel injected) may be controlled at high accuracy.

(5) In addition, the arithmetic operation section 821 is configured to, when the change rate k2 of the drive current at the second measurement timing t2 (that the arithmetic operation section 821 has predicted) is equal to or greater than a predetermined threshold change rate, correct a change rate of the control current predicted at the third measurement timing t3 later than the second measurement timing t2.

With this configuration, the arithmetic operation section 821 predicts a change rate of the future drive current P based on the change rate of the drive current P previously measured to correct the control current S9, and thus accurately corrects the future drive current P. As a result, the arithmetic operation section 821 accurately controls the lift amount of the plunger 402 (amount of fuel injected) in the fuel injector 400 based on the drive current P accurately corrected.

(6) Further, a RAM 40 (current storage unit) that stores drive currents (e.g., drive currents P1 to P6) acquired by the base waveform acquisition section 823 at a plurality of previous times is provided, the arithmetic operation section 821 is configured to calculate an inflection point Pk of the drive current based on the drive currents (e.g., the drive currents P1 to P6) acquired at the plurality of previous times and stored in the RAM 40. Concurrently, the arithmetic operation section 821 is configured to predict the drive current P based on the inflection point Pk that the arithmetic operation section 821 has calculated.

With this configuration, the arithmetic operation section 821 easily predicts each of the drive currents P from the inflection point Pk onward, and controls the lift amount of the plunger 410 (amount of fuel injected) in the fuel injector 400 at high accuracy.

An exemplary embodiment of the present invention has been described above; however, in the present invention, all of the foregoing embodiments may be combined with each other, or any two or more of the foregoing embodiments may be preferably and arbitrarily combined.

In addition, the configurations described in the foregoing embodiment are merely illustrative, and the present invention is not limited thereto; therefore, the configurations described in the foregoing embodiment may be partially replaced with or may be replaced as those in other embodiments.

Further, the configurations described in the foregoing embodiment may be partially added to, deleted from, or replaced with those in other embodiments.

REFERENCE SIGNS LIST 1 electronic control unit (ECU)
10 analog input section
20 digital input section
30 A/D converter
40 RAM
50 MPU
60 ROM
70 I/O port
80 output circuit
81 overall controller
82 fuel injection controller
821 arithmetic operation section
822 correction section
823 base waveform acquisition section
824 A/D converter
825 D/A converter
83 ignition controller
84 cylinder discrimination section
85 angle information generation section
86 rotational speed information generation section
87 Intake air amount measurement section
88 load information generation section
89 water temperature measurement section
100 internal combustion engine
110 air cleaner
111 intake pipe
112 intake manifold
113 throttle valve
113a throttle opening sensor
114 flow sensor
115 intake air temperature sensor
120 ring gear
121 crank angle sensor
122 water temperature sensor
123 crank shaft
125 accelerator pedal
126 accelerator position sensor
130 fuel tank
131 fuel pump
132 pressure regulator
133 fuel pipe
140 cylinder pressure sensor
150 cylinder
160 exhaust manifold
161 three-way catalyst
162 upstream air-fuel ratio sensor
163 downstream air-fuel ratio sensor
170 piston
200 spark plug
300 spark coil
400 fuel injector
402 coil
430 ammeter

The invention claimed is:

1. A fuel injection control device for controlling a fuel injector, the fuel injection control device comprising:
a controller including an analog-to-digital converter, the controller configured to generate a control current for controlling the fuel injector;
acquire, by the analog-to-digital converter, a drive current at each predetermined time for the fuel injector that is controlled based on the control current, wherein a voltage supplied to the fuel injector is held in a constant range;
based on a first drive current at a first time and a second drive current at a second time later than the first time, each acquired by the converter, predict a third drive current at a third time later than the second time using linear extrapolation;
perform a comparison between a predicted electric power amount calculated based on the third drive current at the third time that the controller has predicted and a target electric power amount calculated based on a predetermined target drive current, in order to correct the control current;
when a change rate of the second drive current at the second time is equal to or greater than a predetermined threshold change rate, correct a change rate of the control current predicted at the third time later than the second time;
control, in response to correcting the change rate of the control current, a lift amount of the fuel injector based on the corrected change rate;
correct at least any one of a magnitude and a length of the control current based on a difference between the third drive current at the third time that the controller has predicted and a current drive current acquired at a present predetermined time;
calculate an exceeding time at which the predicted electric power amount is to exceed the target electric power amount; and
when the exceeding time is determined to be below a next predetermined time at which the drive current is acquired, stop generating the control current.

2. The fuel injection control device according to claim 1, further comprising a memory circuit configured to store drive currents acquired by the current acquisition unit at a plurality of previous times, wherein
the controller calculates an inflection point of the drive current based on the drive currents at the plurality of previous times that the current storage unit has stored, and
the controller predicts the drive current based on the inflection point calculated by the controller.

3. The fuel injection control device according to claim 1, wherein
the controller is configured to predict the change rate of the third drive current based on the change rate of the second drive current.

4. A fuel injection control method for controlling a fuel injector including a controller provided with an analog-to-digital converter, the fuel injection control method comprising:
generating, via the controller, a control current for controlling the fuel injector;
acquiring, via the converter, a drive current at each predetermined time for the fuel injector that is controlled based on the control current, wherein a voltage supplied to the fuel injector is held in a constant range;
based on a first drive current at a first time and a second drive current at a second time later than the first time, each acquired via the controller, predicting a third drive current at a third time later than the second time using linear extrapolation;
comparing a predicted electric power calculated based on the third drive current at the third time predicted via the controller and a target electric power amount calculated based on a predetermined target drive current, in order to correct the control current;
when a change rate of the second drive current at the second time is equal to or greater than a predetermined threshold change rate, correcting a change rate of the control current predicted at the third time later than the second time;
controlling, in response to correcting the change rate of the control current, a lift amount of the fuel injector based on the corrected change rate;
correcting at least any one of a magnitude and a length of the control current based on a difference between the third drive current at the third time that the controller has predicted and a current drive current acquired at a present predetermined time;
calculating an exceeding time at which the predicted electric power amount is to exceed the target electric power amount; and
when the exceeding time is determined to be below a next predetermined time at which the drive current is acquired, stopping generation of the control current.

5. The fuel injection control method according to claim 4, further comprising storing, via a memory circuit, drive currents acquired at a plurality of previous times via the converter, wherein
the controller calculates an inflection point of the drive current based on the drive currents at the plurality of previous times stored via the memory circuit, and
the controller predicts the drive current based on the inflection point calculated via the controller.

* * * * *